(12) United States Patent
Jiao et al.

(10) Patent No.: US 10,296,331 B2
(45) Date of Patent: May 21, 2019

(54) LOG-BASED SOFTWARE PORTING

(71) Applicant: International Business Machines Corporation, Armonk, NY (US)

(72) Inventors: Li Mei Jiao, Changping District (CN); Yong Hua Lin, Beijing (CN); Ke Wei Sun, Haidian District Beijing (CN); Rong Yan, Haidian District Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 183 days.

(21) Appl. No.: 15/208,159

(22) Filed: Jul. 12, 2016

(65) Prior Publication Data
US 2018/0018168 A1    Jan. 18, 2018

(51) Int. Cl.
*G06F 8/76*    (2018.01)
*G06F 8/71*    (2018.01)
*G06F 8/30*    (2018.01)

(52) U.S. Cl.
CPC ............... *G06F 8/76* (2013.01); *G06F 8/30* (2013.01); *G06F 8/71* (2013.01)

(58) Field of Classification Search
CPC ..................................... G06F 8/76; G06F 8/71
See application file for complete search history.

(56) References Cited

U.S. PATENT DOCUMENTS

| | | | |
|---|---|---|---|
| 2006/0206861 A1* | 9/2006 | Shenfield | G06F 8/35 717/106 |
| 2007/0011669 A1 | 1/2007 | Varma et al. | |
| 2007/0198973 A1* | 8/2007 | Choi | G06F 8/61 717/151 |
| 2008/0127125 A1* | 5/2008 | Anckaert | G06F 21/53 717/136 |
| 2009/0300057 A1* | 12/2009 | Friedman | G06F 11/3664 |
| 2011/0145806 A1* | 6/2011 | Cook | G06F 8/67 717/170 |
| 2013/0055227 A1 | 2/2013 | Zachariah | |
| 2014/0053135 A1* | 2/2014 | Bird | G06F 11/008 717/124 |
| 2014/0215446 A1 | 7/2014 | Araya et al. | |

(Continued)

OTHER PUBLICATIONS

White paper"Porting of Legacy Software Applications", PM&S Software, p. 1, 2000-2013.

*Primary Examiner* — S. Sough
*Assistant Examiner* — Timothy P Duncan
(74) *Attorney, Agent, or Firm* — Cantor Colburn LLP; Grant Johnson

(57) ABSTRACT

Methods, computer systems and computer program products for service packages porting are provided. Aspects include a computer implemented method for a service package porting is provided. One or more processors provision a component of a first layer based on a plurality of component descriptions and build the service package on the first layer. Hence the one or more processors collect first log information that relates to build failures of the service package. According to another embodiment of the present invention, the method further comprises determine whether a build failure is related to the first layer based on the first log information and remove the component of the first layer if it is determined that the build failure is related to the first layer.

9 Claims, 8 Drawing Sheets

(56) References Cited

U.S. PATENT DOCUMENTS

| | | |
|---|---|---|
| 2015/0033202 A1 | 1/2015 | Wilson et al. |
| 2015/0324182 A1* | 11/2015 | Barros ...................... G06F 8/61 717/174 |
| 2016/0124823 A1* | 5/2016 | Ruan ................... G06F 11/2257 714/26 |
| 2017/0116068 A1* | 4/2017 | Damron .............. G06F 11/0778 |
| 2017/0199737 A1* | 7/2017 | Bofferding ................ G06F 8/76 |

* cited by examiner

LOG-BASED SOFTWARE PORTING

BACKGROUND

The present invention relates generally to the field of data processing and more specifically to software porting.

Software porting is the process of adapting software so that an executable program can be created for a computing environment that is different from the one for which it was originally designed (e.g. different CPU, operating system, or a third party library etc.). The term 'porting' is also used when software/hardware is changed to make them usable in different environments. Software is portable when the cost of porting it to a new platform is less than the cost of writing it from scratch. The lower the cost of porting software, relative to its implementation cost, the more portable it is believed to be.

SUMMARY

Embodiments of the present invention provide methods, computer systems and computer program products for service packages porting. In one embodiment of the present invention, a computer-implemented method for a service package porting is provided. One or more processors provision a component of a first layer based on a plurality of component descriptions and build the service package on the first layer. Hence, the one or more processors collect first log information that relates to build failures of the service package. According to another embodiment of the present invention, the method further comprises determine whether a build failure is related to the first layer based on the first log information and remove the component of the first layer if it is determined that the build failure is related to the first layer.

Computer systems and computer program products for service packages porting are also provided as embodiments of the present invention.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
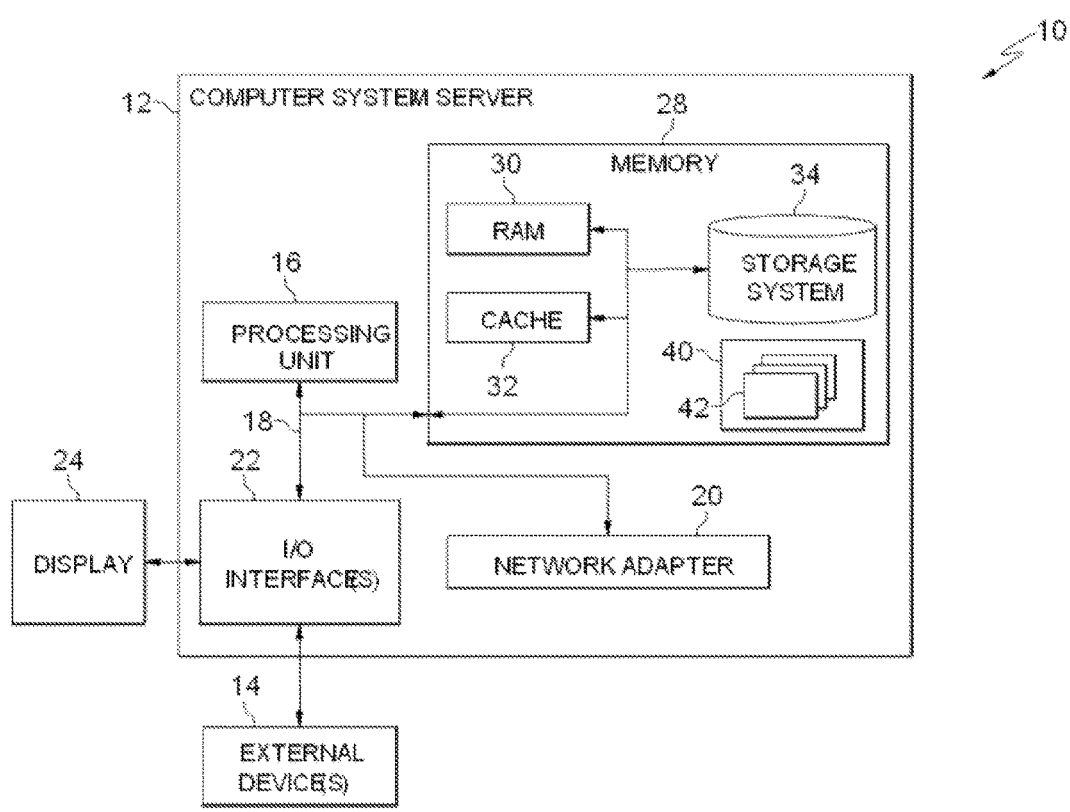
FIG. 1 depicts a cloud computing node, which is applicable to implement the embodiments of the present invention.

Embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As mentioned before, software porting is the process of adapting software in an environment for which it was not originally written or intended to execute in. Software is considered portable when the cost of porting it to a new environment is reasonably less than writing the software from scratch. Software porting is particularly important nowadays as computing environments are becoming more and more complicated. When deploying software, it is necessary to figure out feasible porting environments for it, however very difficult due to the complexity of different environments. The situation becomes even worse with the development of cloud computing technologies as cloud computing environments typically include a large amount of different environments formed by various computing resources, which makes software porting more and more difficult.

In the following, some embodiments of the present invention will be described in accordance with cloud computing environment. It is however understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to microcode, device drivers, redundant processing units, external disk drive arrays, RAID systems, tape drives, and data archival storage systems, etc.

Figure 2:
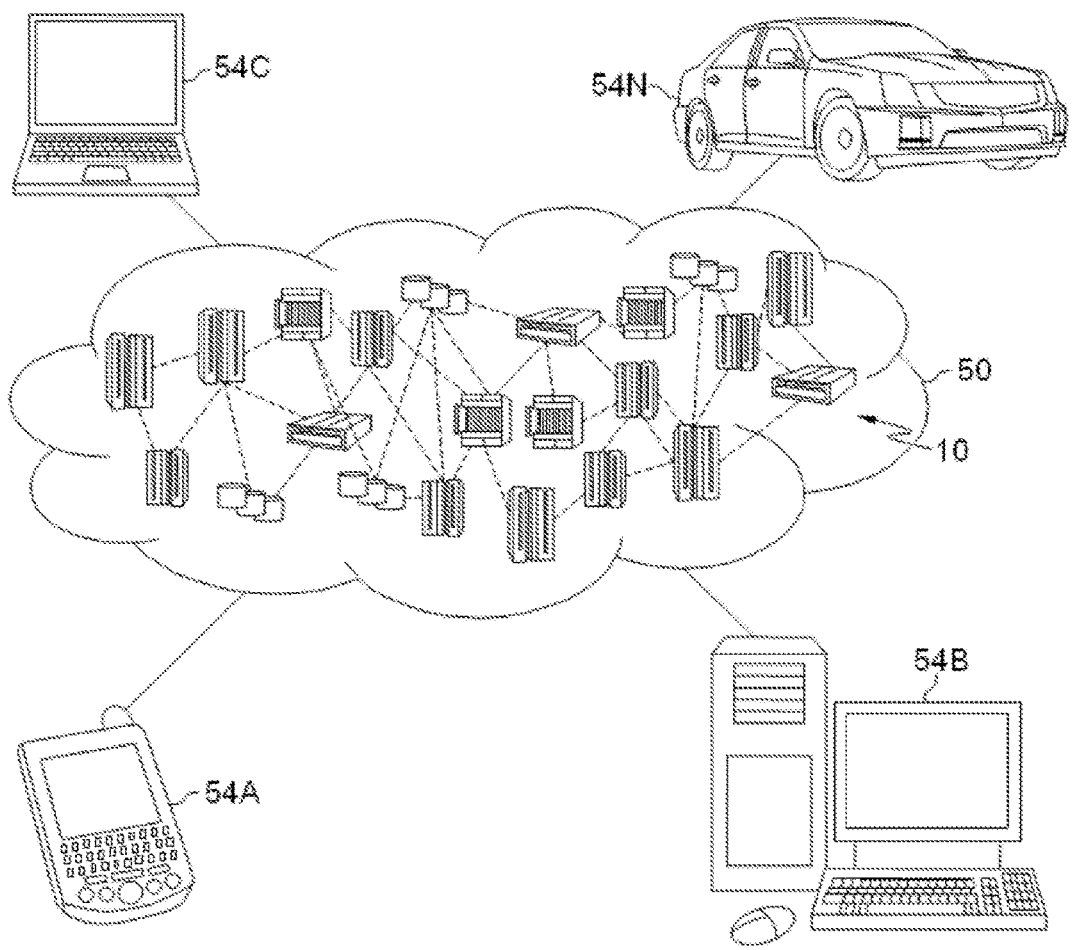
FIG. 2 depicts a cloud computing environment, which is applicable to implement the embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
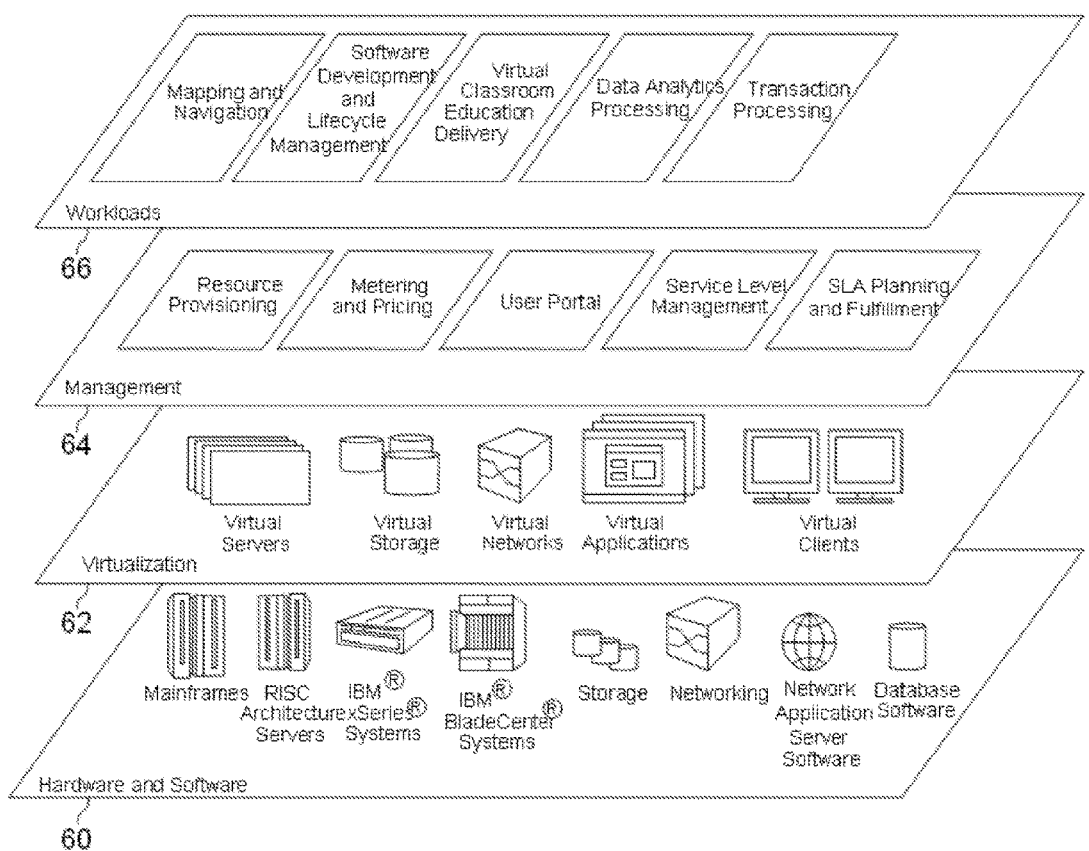
FIG. 3 depicts abstraction model layers of the cloud computing environment, which is applicable to implement the embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM p Series® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include mapping and navigation; software development and lifecycle management; virtual classroom education delivery; data analytics processing; transaction processing etc.

As aforementioned, when deploying software, it is necessary to figure out feasible porting environments for it, for example, whether a piece of software can be compiled with Jave®8 if it can be compiled with Java®7, or whether it will be able to work properly on a mixed infrastructure with RHEL®5 and RHEL®6, or whether it can be installed on platforms with ARM® or PowerPC® ppc641e architectures, etc. In traditional software porting, a physical machine with related software installed needs to be set up for each and every different configuration (operating system, library, runtime, etc.) in order to test whether the software could work on that configuration. When there are a large number of different configurations, the testing process will become tremendously time consuming, tedious and costly. Deploying software in cloud environment can also be referred to as deploying service package, thus in the following description, term 'service package' will be used instead of 'software'.

Figure 4:
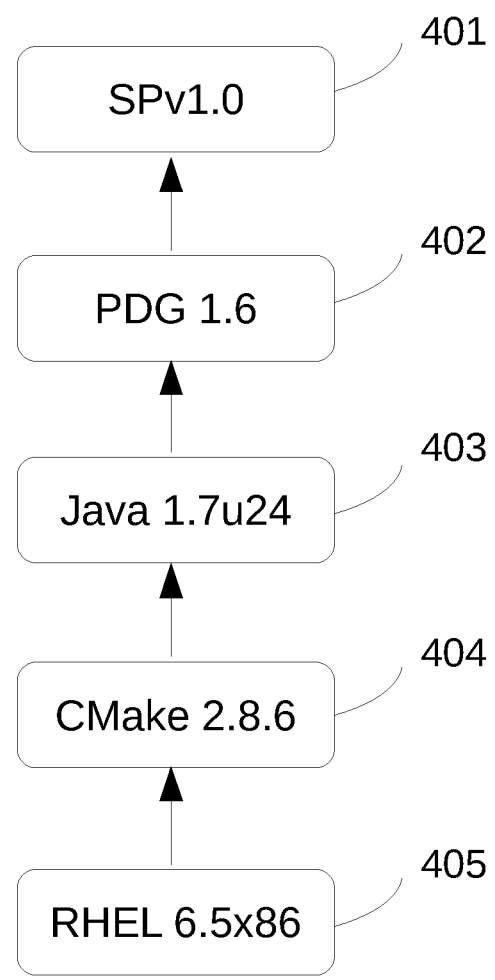
FIG. 4 shows an exemplary service package SPv1.0 401 with its configuration.

Referring to the example of FIG. 4, which shows an exemplary service package SPv1.0 401 with its configuration. In this current configuration, it needs RHEL® 6.5×86 405, CMake 2.8.6 404, Java® 1.7u24 403, and PDG 1.6 402 for SPv1.0 401 to work properly. The problem in question is whether SPv1.0 will work properly on other configurations, for example RHEL® 5.1ppc641e, Java 1.8u2, CMake 2.8.7 and PDG 1.5. In traditional solutions, typically a test with the new configuration is needed to be run to verify whether it will work. When there are a lot of new configurations (it is typically the case in software porting), there is no efficient way to do so as the number of tests will become very large. For example, there are 67 different versions of RHEL®, 106 different versions of Java®, 37 different versions of CMake and 17 different versions of PDG, therefore it will need to run 67*106*37*17=4,467,158 different tests altogether which is clearly time consuming and tedious.

The present invention realizes the previous discussed problems. Embodiments of the present invention provide an effective way to figure out feasible porting environments with reasonable costs, which utilizes well-adopted operating system level virtualization and leverages component descriptions that can be easily obtained to figure out feasible porting environment for service packages, resulting in the simplification of the testing process, therefore reduces the total costs of software porting. A component description refers to a data structure that corresponds to the description of a component according to a standard specification, and with certain processes, the component can be provisioned. A component description can be a file or any other suitable data structure. To simplify the description, the present invention will be described in accordance with Docker® system, a widely used operating system level virtualization technology today. In Docker® system, software is deployed inside software containers, which are instances in operating system level virtualization and may look and feel like a real server from the point of view of its owner and users. Each of the software containers is isolated from each other and inside it, software and its configurations are packaged. In Docker® system, a component description known as 'dockerfile' can be easily obtained from a respository which is a text document that contains all the commands a user could call on the command line to assemble an image. With images, a container can be built. Although embodiments of the present invention are described with Docker® system, however, it should be understood to those skilled in the art, the invention is also applicable to any other systems utilizing operating system level virtualization with corresponding types of component descriptions, as long as software container can be built based on them.

Figure 5A:
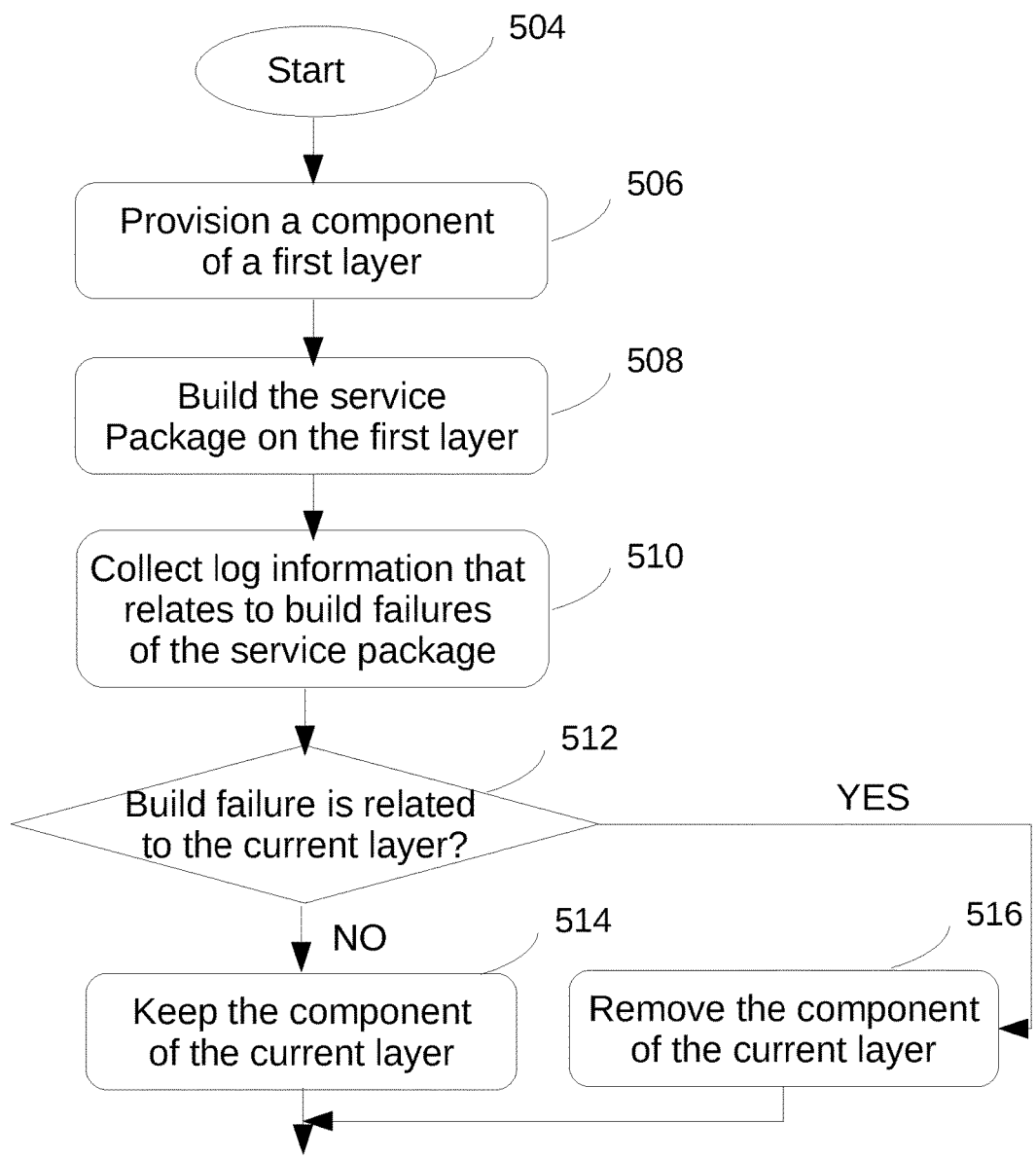
FIG. 5a illustrates part of a method 500 for porting a service package according to embodiments of the present invention.
Figure 5B:
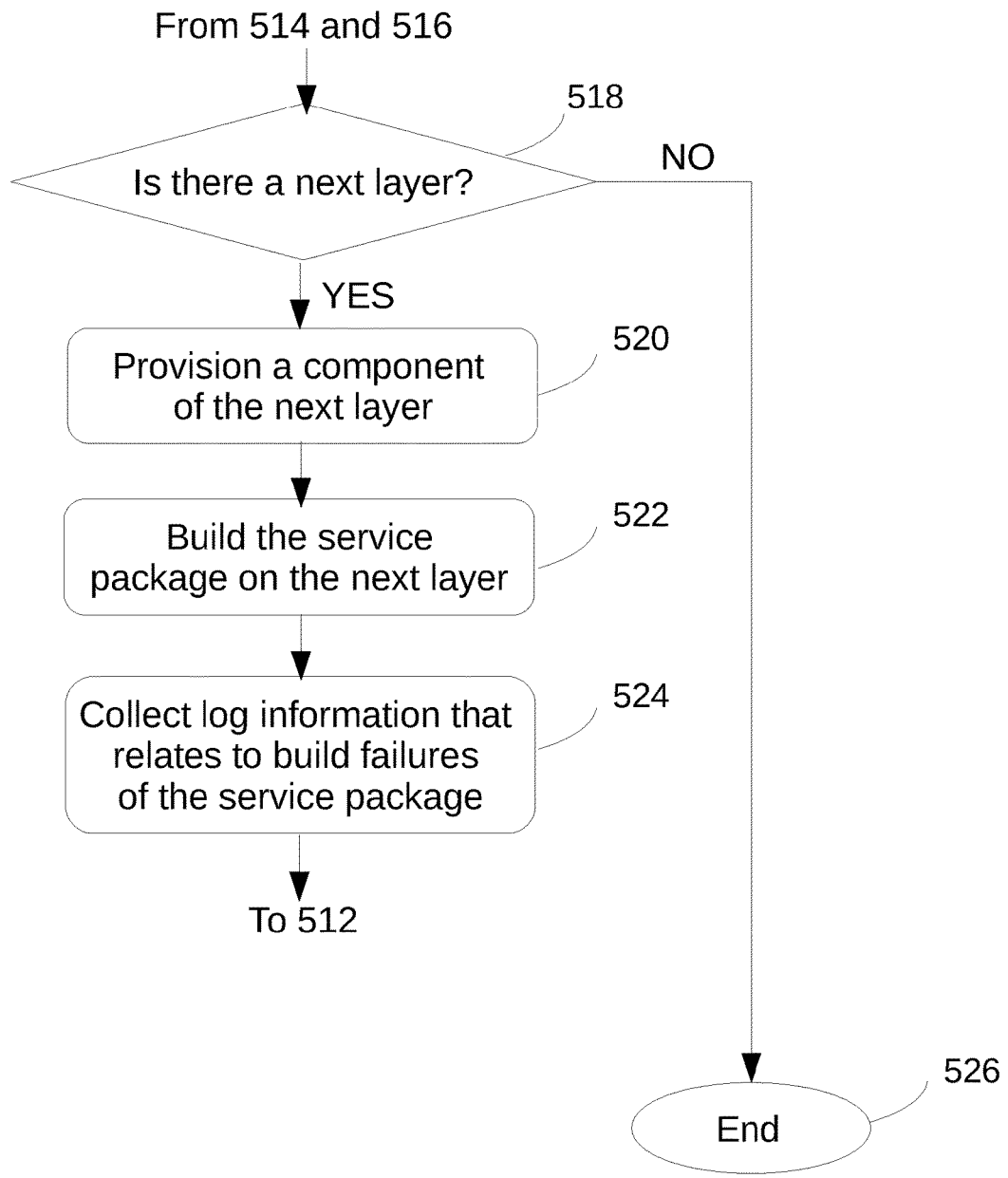
FIG. 5b illustrates another part of a method 500 for portin a service package according to embodiments of the present invention.
Figure 6:
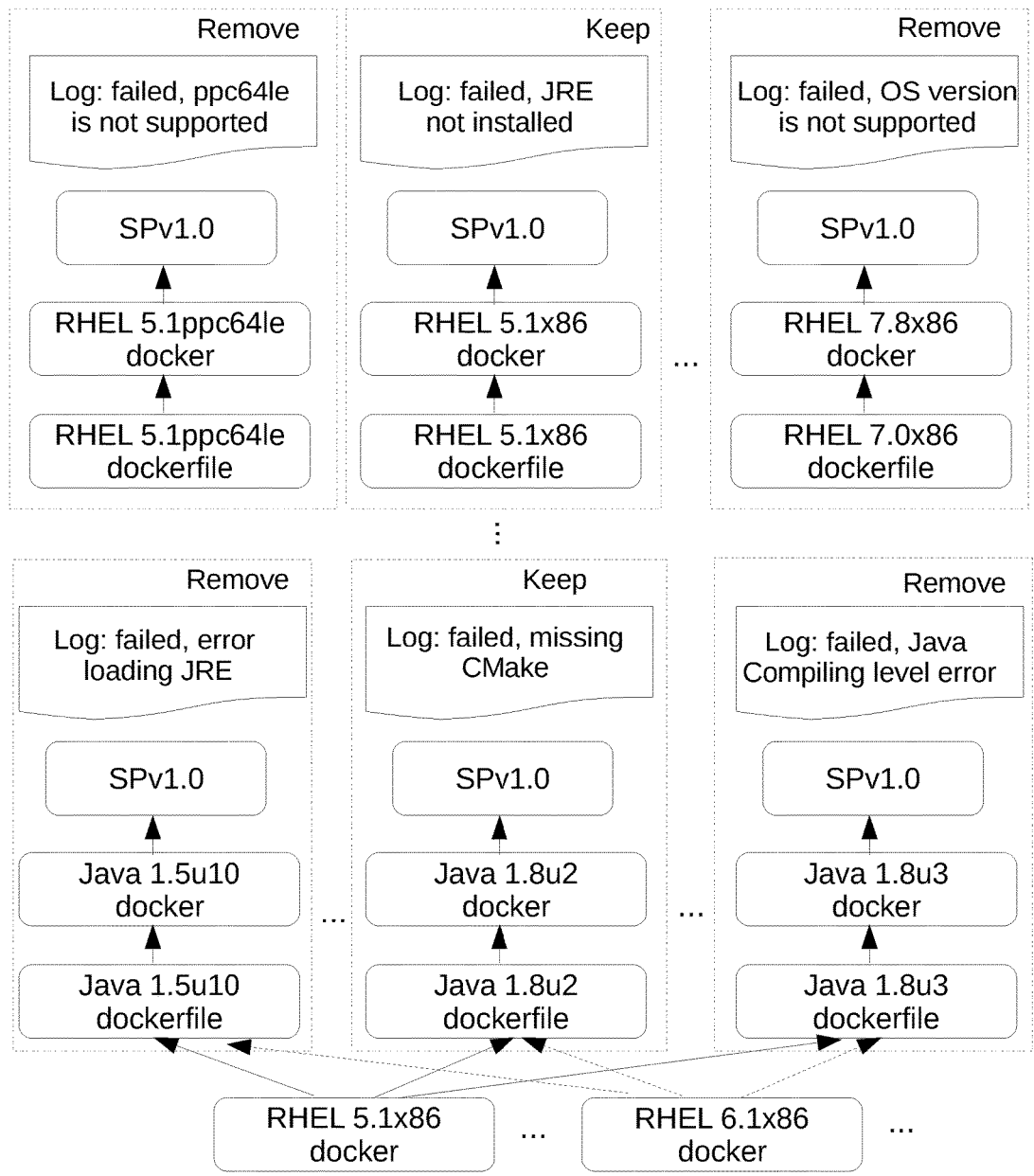
FIG. 6 depicts an example of implementing embodiments of the present invention in which the example of FIG. 4 is used.

With reference now to FIGS. 5a and 5b, which illustrate a method 500 for porting a service package according to an embodiment of the present disclosure. The method 500 starts from step 504. Next, in step 506, a component of a first layer of the container is provisioned based on a plurality of component descriptions. As mentioned above, a component description refers to a data structure that corresponds to the description of the component according to a predefined specification, and with certain processes, the component can be provisioned. Component descriptions together are used to build software containers on top of a hosting operating system in operating system level virtualization technologies. Typically, these component descriptions are of a plurality of layers of a container which together composite all the configurations that a service package needs. Generally, these component descriptions can be easily obtained from a central repository or can be easily written with a standard specification. In accordance with the example of FIG. 4, corresponding component descriptions (i.e., 67 component descriptions for RHEL, 106 component descriptions for Java, 37 component descriptions for CMake and 17 component descriptions for PDG) can be obtained. Referring to FIG. 6, it depicts an example of implementing an embodiment of the present invention in which the example of FIG. 4 is used. In FIG. 6, the first layer is the operating system, i.e., RHEL®. For the service package SPv1.0, there are all together 67 descriptions for the components of the first layer corresponding to 67 different versions of RHEL® components. First, a RHEL® component description, for example, RHEL® 5.1 ppc641e dockerfile is selected and the corresponding RHEL® 5.1 ppc641e component is provisioned. Following it, in step 508, the service package is built on the first layer, in the example of FIG. 6, SPv1.0 is built on provisioned RHEL® 5.1ppc641e (RHEL® 5.1ppc641e docker). Then in step 510, log information that relates to build failures of the service package is collected, that is, if the log information shows the result of the building is a failure, the log information will be collected. For example, if the log information shows 'failed, ppc641e is not supported', it will be collected. In another example with another RHEL® component—RHEL® 5.5×86 component, after provisioning it and building service package SPv1.0 on the provisioned RHEL® 5.5×86 (RHEL® 5.5×86 docker), the log information shows 'failed, JRE not installed'. It will also be collected as it relates to build failure of the service package.

Further, according to another embodiment of the present invention, in step 512, it is determined based on the collected log information whether a build failure is related to the current layer with the log information collected and in step 516, the component of the current layer is removed if it is determined that the build failure is related to the current layer. If, in step 512, it is determined the build failure is not related to the current layer with the log information collected, the component of the current layer is kept in step 514. For each component of the first layer, steps 504 to 510 are executed until all components of the first layer are provisioned and all log information related to build failure is collected. Then for each piece of collected log information, step 512 and corresponding step 514 or 516 are executed, until all collected log information is processed. Alternatively, for each component of the first layer, steps 504 to 510 are executed, and then step 512 and corresponding step 514 or 516 are executed if there is log information that related to build failure is collected, until all components of the first layer are processed. Again, in the example of FIG. 6, take the log information 'failed, ppc641e is not supported' as an example, the log information clearly shows the failure is related to the RHEL® 5.1ppc641e as 'ppc641e is not supported' suggests the build failure is because the RHEL® version is not supported. Therefore, the component RHEL® 5.1ppc641e is removed. Once again, in the example of FIG. 6, take the log information 'failed, JRE not installed' as an example, it clearly shows the build failure is because JRE is not installed, i.e., not related to the current layer (first layer), the component RHEL® 5.5×86 is kept. After all components of the first layer are provisioned, those components of the first layer with build failure of the service package related to the first layer are removed. In the example of FIG. 6, altogether 32 components of the first layer are removed and 35 components are kept, which means almost half of the components of the first layer are removed, i.e., the first factor of the total tests aforementioned is reduced to half, resulting in the total tests reduced to half.

According another embodiment, in step 518 (FIG. 5b), it is determined whether there is a next layer, and if there is no next layer, the method ends in step 526. If there is a next layer, the method proceeds to step 520, in which a component of the next layer is provisioned, wherein the next layer is on top of its previous layer and the component of the next layer is provisioned on top of its previous layer with a component of the previous layer kept in step 514. Then, in step 522, the service package is built on the next layer and then log information that relates to build failures of the service package is collected in step 524. Then, the method proceeds to step 512 (FIG. 5*a*), in which whether a build failure is related to the current layer (here is the next layer discussed) with the log information collected is determined based on the collected log information. If it is determined in step 512 that the build failure is related to the current layer with the log information collected, the component of the current layer is removed in step 516. Alternatively, if it is determined in step 512 that the build failure is not related to the current layer with the log information collected, the component of the next layer is kept in step 514. For each component of the next layer, steps 520 to 524 are executed, until all components of the next layer are provisioned and all log information related to build failures is collected. Then for each piece of collected log information, step 512 and corresponding step 514 or 516 are executed, until all collected log information is processed. Alternatively, for each component of the next layer, steps 520 to 524 are executed, and then step 512 and corresponding step 514 or 516 are executed if there is log information that relates build failure is collected, until all components of the next layer are processed. Then the method returns to step 518, and steps 520 to 524, then step 512 and corresponding step 514 or 516 are executed if the determination returns YES as result, or ends if the determination returns NO as result. In accordance with the example of FIG. 6, after all components of the first layer are provisioned, it is determined whether there is a next layer, in the example of FIG. 6 there is a next layer—Java, and there are altogether 106 descriptions corresponding to 106 different versions of Java. Then each Java component is provisioned on each of the kept component of the first layer and the service package is then built on it. Then log information that relates to build failure of the service package is collected. For each collected log information, whether the build failure is related to the provisioned Java is determined, and if it is determined that the failure is related to the provisioned Java (e.g. log information is 'failed, loading JRE error, or 'failed, Java compiling error' or 'failed, Java version not supported'), the Java component is removed, or if it is determined that the build failure is not related to the provisioned Java (e.g. log information is 'failed, missing CMake' or 'failed, missing PDG'), the Java component is kept until all the Java components are processed. In the example of FIG. 6, altogether 38 Java components are removed and 68 are kept, which means around ⅓ of the components of the second layer are removed, i.e., the second factor of the total tests aforementioned is again reduced ⅓, resulting in the total tests again reduced ⅓. For the next layers—CMake and PDG, after the process described above, altogether 20 CMake components and 5 PDG components are removed, resulting in the total tests as 35*68*17*12=485,520. That is to say, altogether 4,467,158−485,520=3,981,638 tests are reduced, i.e., about 3,981,638/4,467,158*100%=89.13% tests are reduced.

Figure 7:
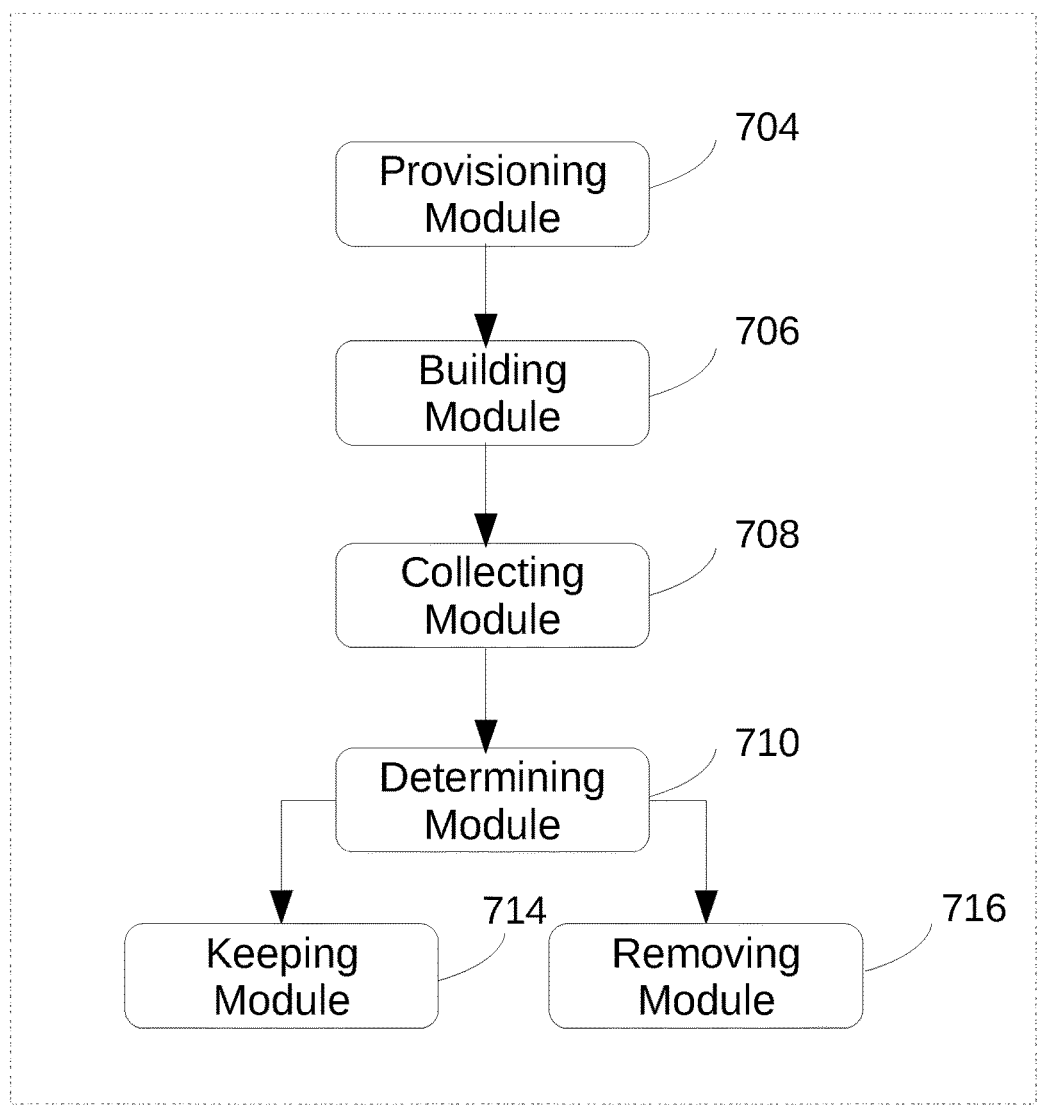
FIG. 7 depicts a block diagram of a system 700 according to an embodiments of the present invention.

Now referring to FIG. 7, which depicts a block diagram of a system according to an embodiment of the present invention. The system 700 for porting a service package comprises a provisioning module 704, configure to provision a component of a first layer based on a plurality of component descriptions and a building module 706, configured to build the service package on the first layer. The system 700 also comprises a collecting module 708, configured to collect first log information that relates to build failures of the service package. According to another embodiment of the present invention, the system 700 further comprises a determining module 710, configured to determine whether a build failure is related to the first layer based on the first log information and a removing module 712, configured to remove the component of the first layer if it is determined that the build failure is related to the first layer.

According to another embodiment of the present invention, the system 700 further comprises a keeping module 714, configured to keep the component of the first layer if it is determined that the build failure is not related to the first layer.

According to another embodiment of the present invention, the determining module 710 is further configured to determine whether there is a next layer, and if it is determined there is a next layer, the provisioning module 704 is further configured to provision a component of the next layer based on the plurality of component descriptions, wherein the next layer is on top of its previous layer, and the building module 706 is further configured to build the service package on the next layer, and the collecting module 708 is further configured to collect a second log information that relates to build failures of the service package.

According to another embodiment of the present invention, the determining module 710 is further configured to determine whether a build failure is related to the next layer based on the new collected second log information, and the removing module 712 is further configured to remove the component of the next layer if it is determined that the build failure is related to the next layer, and the keeping module 714 is further configured to keep the component of the next layer if it is determined that the build failure is not related to the next layer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method for porting a service package, comprising:
    provisioning, by one or more processors, a plurality of components of a first layer based on a plurality of component descriptions;
    building, by the one or more processors, the service package on the first layer;
    collecting, by the one or more processors, first log information that relates to build failures of the service package associated with at least one component of the plurality of components;
    determining, by the one or more processors, whether a build failure is related to the first layer based on the first log information;
    removing, by the one or more processors, the at least one component of the first layer if it is determined that the build failure is related to the first layer; and
    keeping, by the one or more processors, the at least one component of the first layer if it is determined that the build failure is not related to the first layer;
    provisioning, by the one or more processors, a plurality of components of a second layer on top of the first layer based on the plurality of component descriptions, wherein the second layer is on top of the first layer; and wherein the first layer comprises one or more components from the plurality of components that were kept based on the build failure not being related to the first layer;

building, by the one or more processors, the service package on the second layer; and collecting, by the one or more processors, second log information that relates to build failures of the service package.

2. The method of claim 1, further comprising:

determining, by the one or more processors, whether a build failure is related to the second layer based on the second log information; and removing, by the one or more processors, the component of the second layer if it is determined that the build failure is related to the second layer.

3. The method of claim 1, further comprising:

determining, by the one or more processors, whether a build failure is related to the second layer based on the second log information; and keeping, by the one or more processors, the component of the second layer if it is determined that the build failure is not related to the second layer.

4. A computer system for porting a service package, comprising:

one or more processors;

one or more computer readable media; and program instructions stored on the one or more computer readable media for execution by at least one of the one or more processors, the program instructions comprising: program instructions to provision a plurality of components of a first layer based on a plurality of component descriptions;

program instructions to build the service package on the first layer;

program instructions to collect first log information that relates to build failures of the service package associated with at least one component of the plurality of components;

program instructions to determine whether a build failure is related to the first layer based on the first log information;

program instructions to remove the at least one component of the first layer if it is determined that the build failure is related to the first layer;

program instructions to keep the component of the first layer if it is determined that the build failure is not related to the first layer;

program instructions to provision a component of a second layer on top of the first layer based on the plurality of component descriptions, wherein the second layer is on top of the first layer;

wherein the first layer comprises one or more components from the plurality of components that were kept based on the build failure not being related to the first layer;

program instructions to build the service package on the second layer; and program instructions to collect second log information that relates to build failures of the service package.

5. The computer system of claim 4, wherein the program instructions further comprise:

program instructions to determine whether a build failure is related to the second layer based on the second log information; and program instructions to remove the component of the second layer if it is determined that the build failure is related to the second layer.

6. The computer system of claim 4, wherein the program instructions further comprise:

program instructions to determine whether a build failure is related to the second layer based on the second log information; and program instructions to keep the component of the second layer if it is determined that the build failure is not related to the second layer.

7. A computer program product for porting a service package, comprising:

a computer readable storage medium and program instructions stored on the computer readable storage medium, the program instructions comprising:

program instructions to provision a plurality of components of a first layer based on a plurality of component descriptions;

program instructions to build the service package on the first layer; and program instructions to collect first log information that relates to build failures of the service package associated with at least one component of the plurality of components;

program instructions to determine whether a build failure is related to the first layer based on the first log information;

program instructions to remove the at least one component of the first layer if it is determined that the build failure is related to the first layer;

program instructions to keep the component of the first layer if it is determined that the build failure is not related to the first layer;

program instructions to provision a component of a second layer on top of the first layer based on the plurality of component descriptions, wherein the second layer is on top of the first layer;

wherein the first layer comprises one or more components from the plurality of components that were kept based on the build failure not being related to the first layer;

program instructions to build the service package on the second layer; and program instructions to collect second log information that relates to build failures of the service package.

8. The computer program product of claim 7, wherein the program instructions further comprise:

program instructions to determine whether a build failure is related to the second layer based on the second log information; and program instructions to remove the component of the second layer if it is determined that the build failure is related to the second layer.

9. The computer program product of claim 7, wherein the program instructions further comprise:

program instructions to determine whether a build failure is related to the second layer based on the second log information; and program instructions to keep the component of the second layer if it is determined that the build failure is not related to the second layer.

* * * * *